US007702462B2

United States Patent
Fuessley et al.

(10) Patent No.: US 7,702,462 B2
(45) Date of Patent: Apr. 20, 2010

(54) METHOD AND APPARATUS FOR TRACKING INDIVIDUAL PLANTS WHILE GROWING AND/OR AFTER HARVEST

(75) Inventors: Blair C. Fuessley, Lacon, IL (US); Chad M. Marsh, Tiskilwa, IL (US)

(73) Assignee: Pioneer Hi-Bred International, Inc., Johnston, IA (US)

( * ) Notice: Subject to any disclaimer, the term of this patent is extended or adjusted under 35 U.S.C. 154(b) by 0 days.

(21) Appl. No.: 12/136,606

(22) Filed: Jun. 10, 2008

(65) Prior Publication Data

US 2008/0243392 A1    Oct. 2, 2008

Related U.S. Application Data

(63) Continuation of application No. 10/324,288, filed on Dec. 19, 2002, now Pat. No. 7,403,855.

(51) Int. Cl.
*G01N 3/38* (2006.01)
(52) U.S. Cl. .............................. 702/2; 702/5
(58) Field of Classification Search ................ 702/2, 702/5; 47/14–16
See application file for complete search history.

(56) References Cited

U.S. PATENT DOCUMENTS 5,478,990 A    12/1995  Montanari et al.
5,664,402 A     9/1997  Sandvik et al.
5,987,384 A    11/1999  Matson
6,119,531 A     9/2000  Wendte et al.
6,706,989 B2 *  3/2004  Hunter et al. ............... 209/577
6,745,127 B2    6/2004  Crosby
2001/0029996 A1  10/2001  Robinson
2003/0218060 A1  11/2003  Carlson

FOREIGN PATENT DOCUMENTS

GB        2 366 939 A  *  3/2002

\* cited by examiner

*Primary Examiner*—Manuel L Barbee
(74) *Attorney, Agent, or Firm*—McKee, Voorhees & Sease, P.L.C.

(57) ABSTRACT

An apparatus and method of tracking individual plants growing and/or taken from a growing location, such as a field, growing bed, plot or greenhouse. Machine-readable data related to selected individual plants is maintained in close association with corresponding plants while growing or if the plant is taken from the growing location. Information about each plant, e.g. traits, characteristics, genetic make-up, can be added to a database that correlates the information to the machine-readable data. Thus, individual plants can be tracked and information about the plant is available by maintaining the machine-readable data with the plant. The machine-readable data can be read by a machine operatively communicated with a computer on which is stored the database. Identity and information about the plant is therefore available, without keeping specific track of a plant.

20 Claims, 4 Drawing Sheets

METHOD AND APPARATUS FOR TRACKING INDIVIDUAL PLANTS WHILE GROWING AND/OR AFTER HARVEST

CROSS-REFERENCE TO RELATED APPLICATIONS

This application is a Continuation Application of U.S. Ser. No. 10/324,288 filed Dec. 19, 2002, herein incorporated by reference in its entirety.

I. BACKGROUND OF THE INVENTION

A. Field of the Invention

The present invention relates to maintaining identification data with selected individual plants whether in or taken from field, growing bed, plot, greenhouse, or other growing location, and using that individualized identification data over a period of time and events to maintain correlation of individual plants with traits or characteristics of those selected plants. In one aspect, such associated data can be used to make decisions regarding use of a plant or its progeny. One example is use to advance a breeding or genetic line.

B. Problems in the Art

It is conventional in the art of plant advancement or plant breeding experiments to plant seed of known parentage in plots. Sets or populations of seed (e.g. soybean varieties or corn inbreds or hybrids of like parentage, or genetically engineered plants) are planted together and records are kept to index the location of each set relative to plots or sub-divisions of the plot. In some cases, records are kept of the location of each plant in the plot.

After the seed emerge and plants develop from the seed, the plants can be tested or evaluated by methods well known in the art to derive information about traits or characteristics of the plants. In one example, leaf punches can be taken from selected plants, and then analyzed by methods known in the art for such things as traits or characteristics or genetic make-up. Other types of evaluation can be used including, but not limited to non-destructive evaluation or mere observation, to derive some trait or characteristic of the plant.

There can be one or two, or a significant number of, evaluations or observations, e.g. 70-100 or more, that are recorded for each selected plant. Conventionally, this is done by recording the location of a selected plant in the plot in a notebook, and adding hand-written observations or test results related to the plant or to a punch taken from the plant. Location information is usually possible because of the commonly used indexed grid for such plots (a two-dimensional matrix). Thus, there is a record correlating plant position in a plot and trait(s) or characteristic(s) of interest about the plant.

Also present conventional methods do include attempts to maintain information specific to individual plants at least through part of the process. But a worker has to refer back to notes when looking for plants with desired traits or characteristics, and then physically go out to the plot, locate desired plants, harvest them, and bring them to the threshing site. This is cumbersome, time-consuming and subject to human error. Lap top and hand-held computers may take away some of the issues associated with manual, handwritten record keeping, but still problems and deficiencies remain.

Even using the above-described record-keeping method, once a plant is harvested and no longer in a fixed, indexed position in a plot, there is a loss of correlation between plant and notebook data. It is difficult or unmanageable to harvest a plurality of plants, thresh them, and individually keep track of which plant came from which location in the plot; not to mention which seed came from which plant. While this, theoretically, could be done by keeping close track of which plant is from which location in the plot; it would be difficult and impractical to do. Therefore, it is not impossible to maintain correlation between sets of harvested plants and the plot in which they grew, but it is not realistically possible and practical; and it is even more difficult to maintain correlation between individual plants, parentage, and specific plot location throughout this type of process. Even in single plant threshing methods, where selected plants are individually picked from the field plot and then brought to a threshing location and threshed one by one; to keep accurate track of each individual plant is difficult or impossible, given practical resource and economic constraints.

Many times it is the progeny of the plants, e.g. its seed, that is desired and useful for possible further use. Even if location of a plant in a plot and its associated traits or characteristics are keyed into a database, or are logged in a handwritten notebook ledger, when decisions arise about what types of traits or characteristics are needed, e.g. for a plant breeding or advancement experiment, the pre-recorded information is reasonably suited for identifying plants that fit the need, and even for finding their location in the field plot. However, it is not well suited to maintain an exact correlation of each plant's traits and characteristics with each plant when it comes time to harvest and thresh the plant for its seed.

In the present state of the art utilizing the above-described procedures in plant breeding or advancement experiments, plants are selected as candidates for a plant advancement experiment by evaluation of the information recorded in a notebook or a computer. The selected plants are individually located by referring to recorded grid location (with some risk of human error), and harvested (pulled, cut down, or otherwise removed from the ground). Plants from the same plot or population may be maintained segregated from other harvested plants, but are normally taken back en masse to the threshing location. Correlation between individual plants and their locations in the plot is lost, as is any ability to match a plant to recorded data about the specific plant. They are individually threshed (by hand or mechanized) but in essentially random order. Therefore, although the seed is from the same population of plants, only generalized characterizations can be made of the population because it is not precisely known which seed came from which plant. Data can not be tied to each individual plant. Each population has to be generalized as to which genes or traits, for example, they possess. The generalized characterizations are believed by many persons to be reasonable because the threshed seed should be from the same population. But only generalized characterizations can be made and, thus, only generalized characterizations are available to make decisions as to how to use plants in breeding or plant advancement programs.

This makes the selection process more complicated, especially once the population has made it to more advanced stages of testing. It is well known in the art that plants growing from two different seed of the same parentage may develop non-identical traits or characteristics, just as human children from the same parents may. Thus, decision-making based on generalizations, rather than by evaluating traits or characteristics of individual plants, is not as flexible or accurate as might be desired.

These problems exist in plant breeding programs and experiments, as well as in experiments that are focused on identifying, tracking, modifying, or advancing a genetic trait or characteristic. As used herein, the term "plant breeding or advancement experiment" will be used to generically refer to any type of program to identify, track, modify or advance a trait or characteristic of a plant, whether by breeding or genetic identification and manipulation methods. To distinguish between breeding and genetic methods, the term "genetic modification experiment" will be used to identify genetic methods.

Breeding and genetic methods and techniques can be used together. For example, it is common in the art to use genetic methodologies in a plant breeding program. For further example, plant breeding techniques known in the art and used in a maize plant breeding program include, but are not limited to, recurrent selection, backcrossing, double haploids, pedigree breeding, restriction fragment length polymorphism enhanced selection, genetic marker enhanced selection, and transformation. Often a combination of these techniques is used.

The term "characteristic" is intended to be broad and cover any discernable, measurable, or objective or subjective feature, constituent, trait, tendency, fact or supposition about or related to a plant or its seed or parentage.

There is a real need in the art to have an apparatus, method and/or system for keeping more individualized information about individual seeds or plants through at least a part of their growing cycle, and/or thereafter.

An approach to autonomously derive information related to traits or characteristics of plants when harvesting them is disclosed in U.S. Pat. No. 5,987,384 issued Nov. 16, 1999 to inventor Matson. A mechanized automotive thresher is outfitted with equipment that can non-destructively attempt to derive traits or characteristics from plants or seed as they are being harvested and/or threshed in the field. This patent discloses much state of the art information about how conventional experimental plots are set up and indexed by location. This patent also discusses conventional issues and methods of how determinations are made whether to keep or discard seed.

U.S. Pat. No. 5,987,384, which is incorporated herein by reference in its entirety, relates to harvesting entire plots mechanically, but also is an example of a method employing generalized characterizations in the context of such experimental plant breeding plots. There is no way to know precisely which mechanically harvested and threshed seed relates to which harvested plant. Therefore, even the method of this patent has accuracy and other problems because of lack of particular and specific correlation of data about a set of seed from a plant from its planting to its future use.

There are other situations wherein it would be beneficial to maintain identifying data about individual plants correlated to other data about the plant in machine-readable form attached or closely associated with the plant.

II. SUMMARY OF INVENTION

Identifying data about selected individual plants is correlated to the individual plants once they have emerged as plants. One embodiment maintains the identifying data with individual plants by attaching or closely associating machine-readable data with selected plants. In one aspect of the invention, the identifying data includes a plant identification, which in turn is correlated to a field or growing location, for example, an indexed location in a field plot or greenhouse.

At selected times, selected plants can be evaluated and traits or characteristics of each plant derived and recorded or stored in a manner that is associated with the identifying data of each plant. One embodiment removes physical specimens or samples from a plant, evaluates the sample for genetic or other traits or characteristics of interest, and stores data from the evaluation in a database correlated to the identifying data for the plant. Other embodiments can derive data about a plant's characteristics or traits by other methods or means.

Thus, the identification data is individually associated with selected plants. It is also adapted to stay with or be maintained with individual plants while growing in the field and even after being harvested. When desired, the identification data can be read or retrieved, which allows correlation with the previously derived traits or characteristics of that specific plant. This correlated information about an individual plant can be used to determine whether or not the specific plant or its seed should be further used. In one aspect of the invention, the information can be used to decide whether to thresh the plant and use the seed from the threshed plant further in a plant breeding or plant advancement program or experiment, or whether it should be discarded or otherwise utilized.

Other aspects of the invention comprise applications other than plant breeding or plant advancement programs or experiments.

Features, Advantages, or Objectives of Invention

1. In one aspect of the invention, decisions whether to utilize individual plants to advance a plant line, for example, would be more accurate and more cost-effective if individual data about each plant were available and could be maintained with that plant, instead of using generalized characterizations about the population from which the plant came.

2. A further aspect of the invention uses the ability to maintain correlation between specific individualized data about a specific individual plant and the specific plant itself to decide where and how that plant should be further used. One example is further use in a breeding or plant advancement program. In a further aspect of the invention, according to pre-determined rules or needs, the plant-by-plant correlated information can be used to decide what to do with the plant or seed; e.g. where to send seed from the plant, where to plant seed from the plant, and/or in which further breeding or plant advancement programs the seed or the plant should be used.

3. The invention is adaptable in whole or in part to computerization, and can be advantageously used with software programming and databases. For example, it can be used to keep track of an inventory of individual plants or seed for individual plants in a plant advancement program. It saves time and avoids manual hand-written logs or indexes.

4. The convenience, flexibility, efficiency and economy of tracking or selecting plants, e.g. in a plant advancement or breeding experiment, are increased with the invention.

5. An improvement in resource allocation (labor and other costs) is achieved with the invention.

6. The invention at a minimum is on the same order of accuracy as with present methods relative maintaining identification of a plant and information about it, or decision-making about the plant or its seed.

7. An optional aspect of the invention uses an indexing container or tray, such as a tray with a plurality of indexable cells or compartments, in an efficient manner.

III. BRIEF DESCRIPTION OF DRAWINGS

IV. DETAILED DESCRIPTION OF THE PREFERRED EMBODIMENT

A. Overview

To assist in an understanding of the invention, exemplary embodiments according to the present invention will now be described in detail. Reference will be taken, from time to time, to the above-identified drawings.

Several exemplary embodiments will be described in the particular context of a soybean genetic advancement program to identify soybeans with preferred genetic traits. However, the invention is applicable to other uses including, but not limited to, analogous plant advancement programs such as variety, inbred, or hybrid breeding programs or other selection applications, or combinations thereof.

B. General Environment of Exemplary Embodiment

In one preferred embodiment, plants 12 (see FIG. 1) are soybeans. In other embodiments, plants can be corn, wheat, flax, rapeseed, cotton, oats or barley. The invention is applicable to still further seed and plants.

Figure 1:
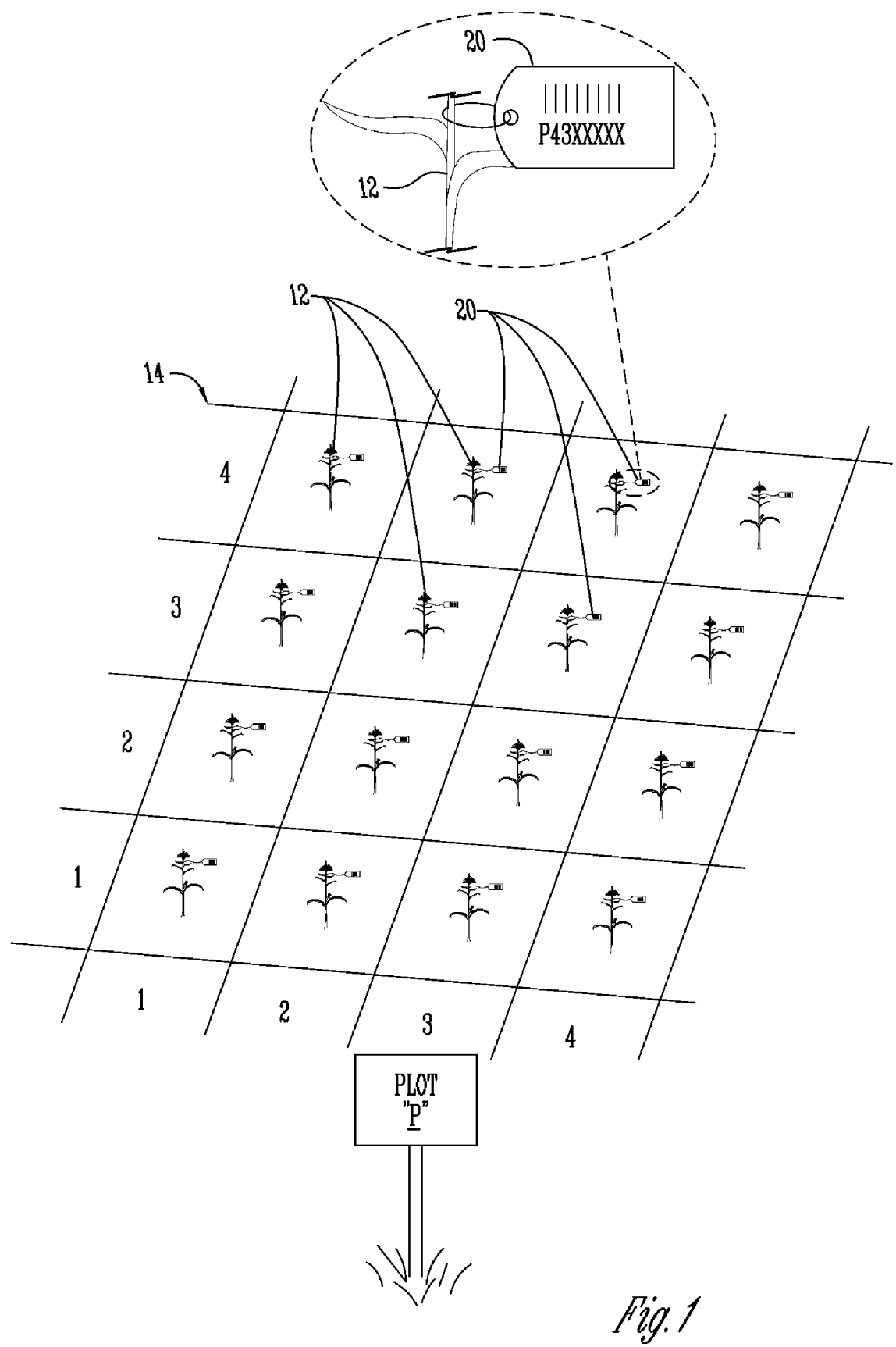
FIG. 1 is a diagrammatic view of several plants with attached bar codes that include plant numbers indexed to the plot in which the plants are growing.

As diagrammatically illustrated in FIG. 1, plants 12 (from known parentage seed) are grown in a plot P. The plot is sub-divided by a two-dimensional XY grid (see reference number 14) into rows and columns shown diagrammatically in FIG. 1 (each row 1, 2, 3, . . . illustrated horizontally across the sheet of FIG. 1, and each column 1, 2, 3, 4, . . . shown vertically on the sheet of FIG. 1).

C. Apparatus of Exemplary Embodiment

In the preferred embodiment, identifying information about individual plants 12 is configured or encoded in machine-readable form and associated with the plant 12. Preferably, this association is close physical association; and further, is by attachment of the machine-readable information or data to the plant 12. It is preferred that the machine-readable data be able to withstand varying environmental conditions, such as weather, moisture, heat, wind, insects and animals, and other conditions or forces that can arise in outdoors fields or greenhouses. In one preferred embodiment, the machine-readable data is on a carrier and comprises a bar code on a bar code tag 20 (e.g. bar code within sealed clear plastic case or lamination). The identifying information could be plot number (relative a predetermined grid of plots). Alternatively, it could be experimental unit number (a created number associated with a population) and a plant number (e.g. 1 to 96 for conventional soybean plots).

Figure 2:
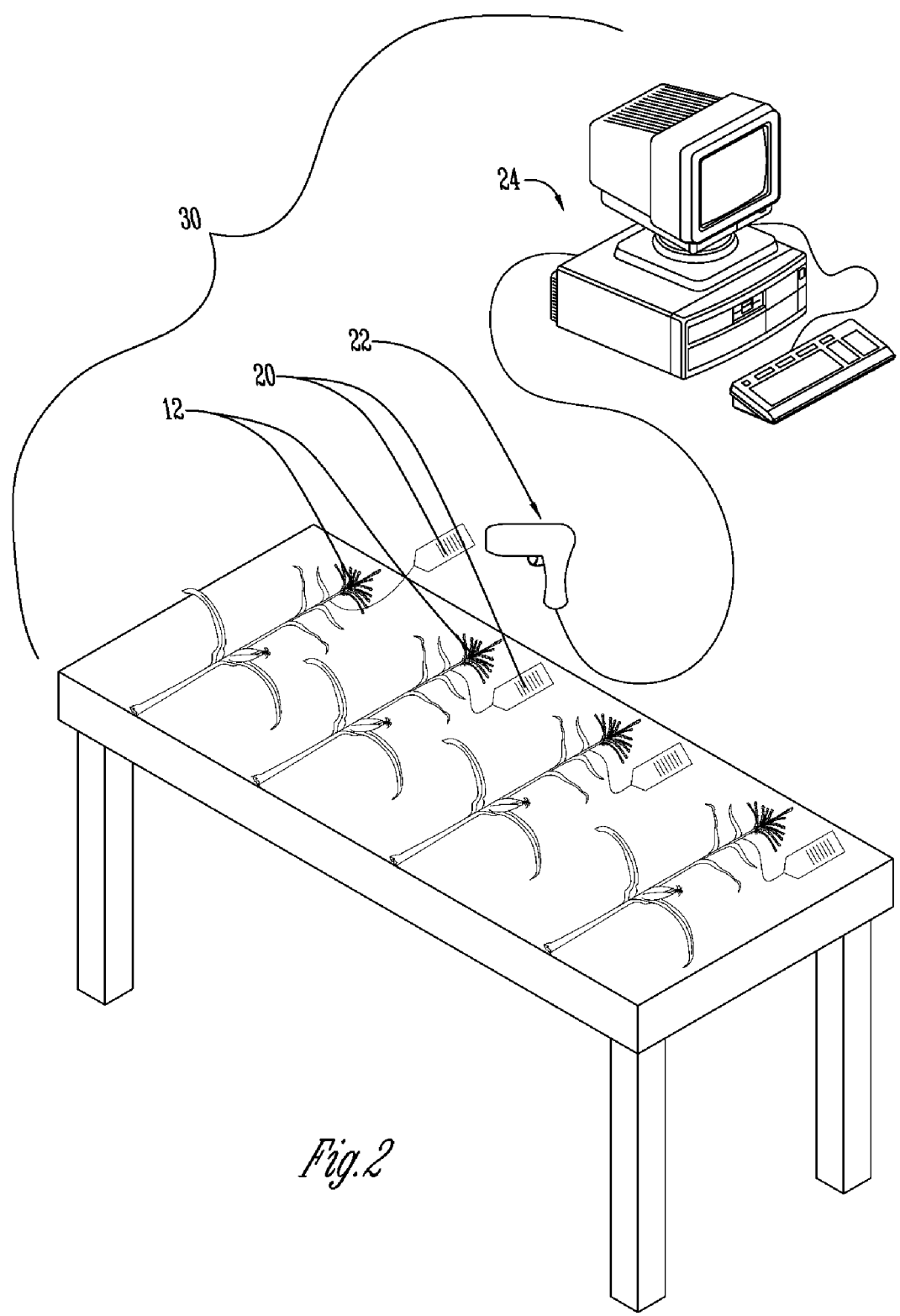
FIG. 2 is a diagrammatic depiction of a threshing site, including a bar code scanner and a computer.

A machine to read machine-readable data can be a conventional bar code reader 22 (see FIG. 2), preferable in operative connection to a computer 24 (e.g. PC 24) with a bar code reader interface. These components are conventional, well known, and commercially available.

By machine-readable it is meant a medium capable of storing data in a form that can be accessed by an automated sensing device. The data is usually directly readable by a computer or digital processor. This includes, but is not limited to, information that can be identified and read or derived by a reading device and is information or data associated, stored, or placed with a readable label, tag, or other carrier. Examples include bar codes, RF tags, magnetic disks, cards, tapes, and drums, punched cards and paper tapes, optical disks, and magnetic ink characters.

A bar code reader interfaced with a PC (e.g. hard-wired or wireless) can be used at field plot P to scan a bar code 20 and automatically identify a plant prior to entering further information or observations about the plant into the PC database. Alternatively, or in addition, a bar code reader can be in operative communication (e.g. wireless) with a PC at a threshing location away from the plot (many times indoors), where plants can individually be handled and processed (see FIG. 2). A bar code reader at the threshing location can also automatically identify a plant.

In one preferred embodiment, PC 24 includes software that is adapted to interpret the machine-readable data and an algorithm to decide the disposition of the plant's seed. Software is pre-programmed with rules as to how to determine whether to save or discard certain seed. A database addressable by PC 24 can include any form of storage of digital information including data sets. In one preferred embodiment, the database contains plant number identifiers and lab results from analysis of plant punches taken from selected known plants 12 in plot P.

D. Operation of Exemplary Embodiment

One example of a method according to the invention operates as follows. The method relates to single plant threshing of soybeans utilizing apparatus shown in the Figures.

Soybeans are planted in a field or plot P. After the plants emerge from the ground, bar code tags 20 are attached to selected plants (e.g. manually tied, attached or hung on the plant, e.g. with string, rubber band, wire, plastic tie, or otherwise, in a manner that does not damage or inhibit normal plant growth or development). Each bar code includes the plot number, plant advancement program number and plant number. The plant number is determined from the location of the plant in the field.

During growing, punches are taken from selected tagged plants and sent to a laboratory to determine, by procedures such as are well known in the art, if a plant contains genetic markers indicating it has genes that make the plant resistant to a yield-reducing affliction. An example of an affliction of interest with soybeans is soybean cyst nematode. The results are entered into a computer database and correlated with the plot number, plant advancement program number and plant number (see step 48, FIG. 3).

Figure 3:
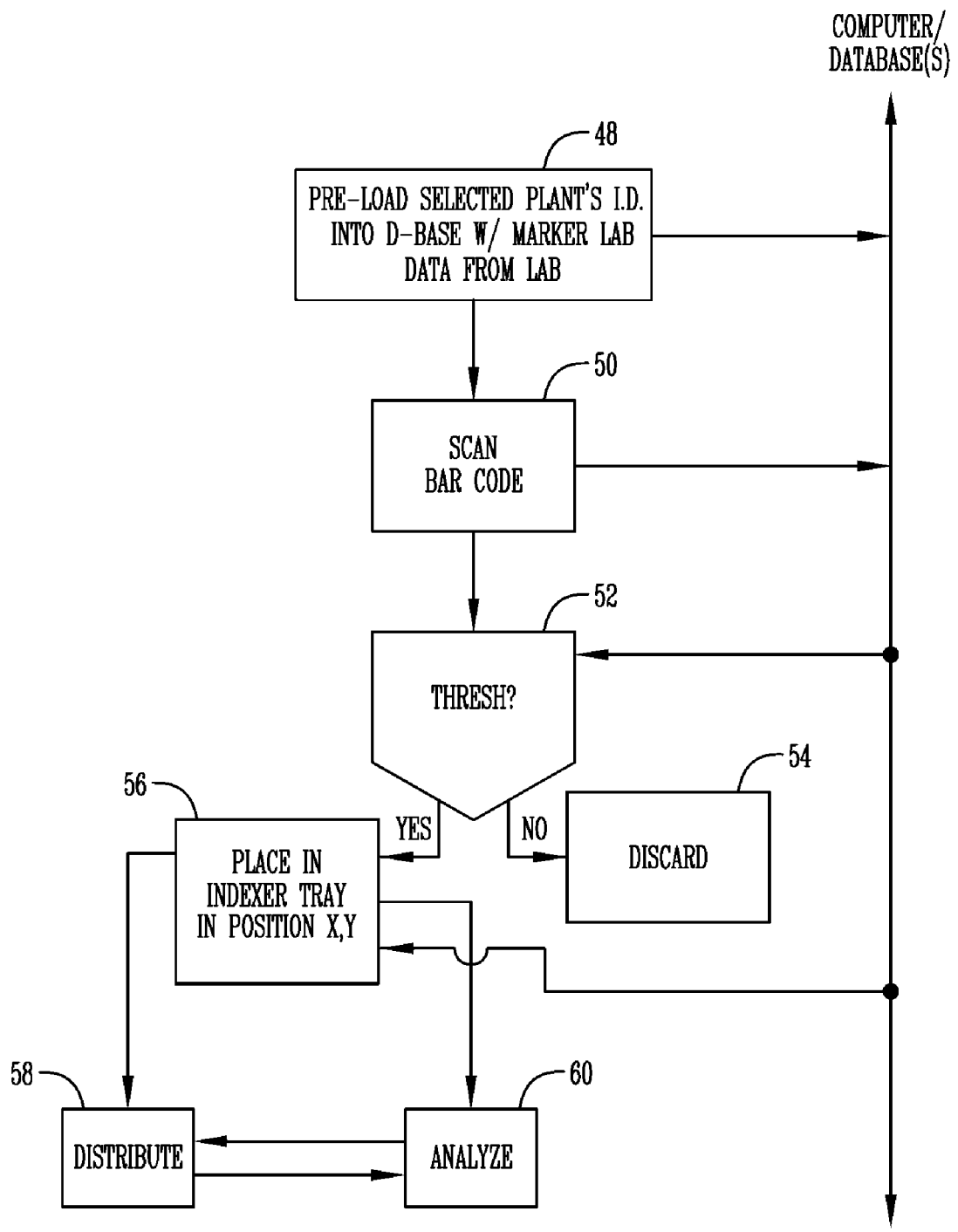
FIG. 3 is a flow chart of a methodology according to an embodiment of the invention.

By referring further to FIG. 3, a method of handling the plants and progeny seed from the plants is illustrated. At the appropriate time, tagged plants 12 are harvested and taken to a threshing site 30 (see FIG. 2) where there may be a threshing machine adapted to thresh individual plants (not shown) and a bar code scanner 22 interfaced with a computer 24. Alternatively, each plant can be threshed by hand. Because identifying information (a bar code) remains attached to each plant 12, special handling (such as keeping the plants in order or remembering which plant is which) is not required.

The bar code attached to a plant 12 is scanned (FIG. 3, step 50). Computer 24 correlates the data identifying plant 12 with the stored genetic data. Computer 24 ranks the value of plant 12 based at least in part on the presence or absence of desired genetic traits according to rules pre-programmed into computer 24.

Computer 24 tells the user (e.g. via displayed instructions on the computer monitor) whether to thresh, discard or save plant 12 for later use (FIG. 3, step 52). If not threshed, computer 24 tells the user to discard the plant and/or its seed (FIG. 3, step 54). If threshed, computer 24 tells the user into which cell of an indexer tray 40 to place the seed (FIG. 3, step 56).

Figure 4:
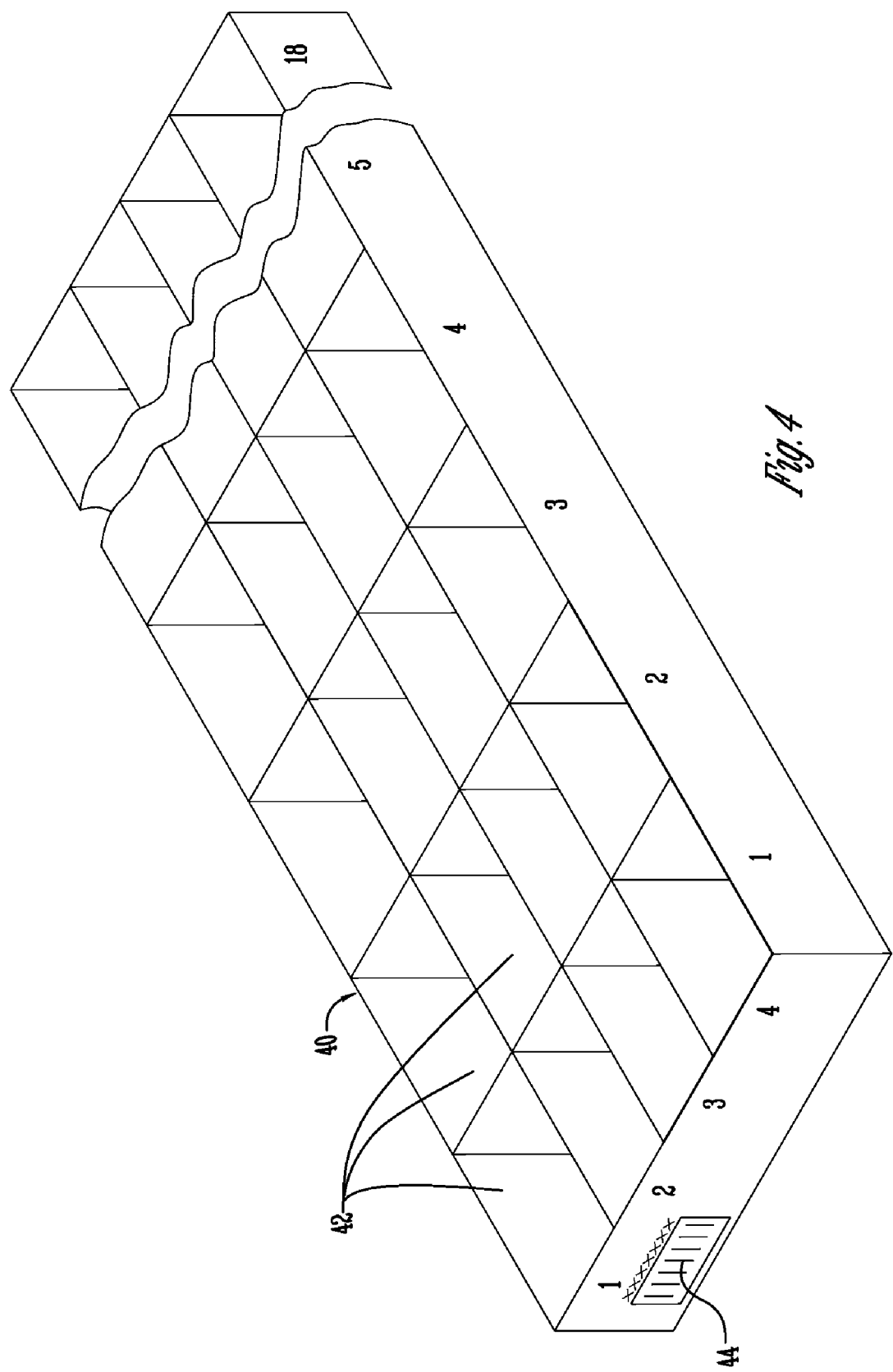
FIG. 4 is a diagrammatic depiction of an indexer tray for use with an embodiment of the present invention.

In one preferred embodiment, the indexer tray 40 has cells 42 arranged in a like manner to the subdivisions of a standard experiment plot (correlated to an indexing method, such as a two-dimensional X, Y coordinate position) (see FIG. 4). One conventional arrangement of experimental plot P has four columns and 18 columns. Each cell typically holds 35 seed. Such correlated indexer trays having four columns and eighteen rows are currently used in the art.

Optionally, a bar code or other machine-readable tag 44 (see FIG. 4), encoded with information regarding the disposition of seed in cells 42 in tray 40, can be attached to tray 40 after filling of one or more cells 42 of tray 40 in completed. From databases (including but not limited to those described previously), the identification of the seed in a cell 42 is known because identifying information about the specific plant which produced the seed was maintained from a time when the plant emerged from the ground in the plot until threshing the seed from the plant. Then, identifying information about the seed from the plant is easily correlated to location in one of the trays 40. The X-Y index of tray 40 may or may not mimic the X-Y grid of plot P.

Computer 24 can also decide where the seed will go (e.g. what winter nursery) and how they should be used according to pre-programmed rules. This is made possible by pre-loading identifying information about the selected plants into the database along with marker lab data from the lab. The user decides what traits will go to which nurseries in a predetermined manner, where the rules for disposition of plants based on traits are put into the computer software. As shown in FIG. 3, generally at steps 58 and 60, once the computer has indicated where the seed should go, the seed can then be distributed (step 58—e.g. by shipment to a winter nursery). Alternatively or in addition, the seed (or a subset of it) could be further analyzed (step 60). As illustrated in FIG. 3, data regarding each plant is maintained with each plant or its seed during most, if not all, of this process.

The rules can vary according to need. For further example, the rules could relate to traits desired for certain nurseries. The desired traits could be placed in a rules database. When a plant is threshed, by scanning its machine-readable data, the computer can immediately access the recorded traits of the plant. Those traits can be compared to the rules database, which would determine such things as (a) if there is any valid match (and if not the seed would probably be discarded) or (b) which nursery is the closest match (and the user would be instructed to place the seed in a tray that is destined for the matched nursery).

The "rules" for one example and for soybeans could be: Seed from all single plants with a resistance gene for phytophthora in combination with soybean cyst nematode (SCN) resistance go to Chile for yield testing. Seed from plants with SCN resistance only, but missing phytophthora genetics, go to a different testing at a United States location. In either case, all data associated with a plant (or its seed) stays with the plant (or its seed). Another characteristic of interest would be resistance to Brown Stem rot. Other examples exist.

Another example of "rules" relating to genetic markers is as follows. Once growing, punches of selected plants are taken and sent to the laboratory for analysis. DNA is extracted from each punch. The lab reports back which plants have which genetic markers. There may be several markers (e.g. 3 or 4) of particular interest.

Each plant is ranked. Plants with the right markers are designated the highest priority. Alternatively, each marker could be weighted. This could vary from breeding system to breeding system. An example would be to rank soybean cyst nematode resistance as most important, a second marker of second importance, and so on.

Below is a specific example for soybeans and markers indicative of a gene related to a transgenic trait. The presence of each marker is ranked on a scale of "1" to "5", with 1 being the most important, 2 being second-most important, and so on:

| | Rank | | | | |
|---|---|---|---|---|---|
| Marker | 1 | 2 | 3 | 4 | 5 |
| Rps1k | | | X | | |
| Rps1c | | X | | | |
| Rps3a | | X | | | |
| Rps3c | | X | | | |
| Rbs3a | | | X | | |
| Rbs.3b | X | | | | |

Another or further example is:

| | Rank | | | | |
|---|---|---|---|---|---|
| Marker | 1 | 2 | 3 | 4 | 5 |
| PI88,788 SCN race 3 | | | | X | |
| Peking SCN race 1 | | X | | | |
| Peking SCN race 3 | | X | | | |
| PI437,654 SCN race 1 | | X | | | |
| PI437,654 SCN race 2 | | X | | | |
| PI437,654 SCN race 3 | | | | X | |
| PI437,654 SCN race 5 | | X | | | |
| PI437,654 SCN race 14 | | | X | | |

The lower the ranking, the higher in priority the marker is to the plant advancement experiment. Thus, the lower the cumulative score, the higher the priority to use the seed of the plant for the experiment.

A further alternative would be to rank based on the number of markers in a plant. For example, if 4 markers of interest are found, it would be given a certain rank. If 7 markers of interest were found, a higher rank could be given. The rank could be derived from a knowledge base. For example, a knowledge base could have experimentally derived yield results likely for plants having four certain markers, versus plants having those four plus another certain marker, versus plants having those five plus another certain marker, etc. With such knowledge, identification of seven markers of interest could be given a higher weight for yield by some predetermined amount over identify of markers of interest. The weighting could be mathematical (e.g. based on difference in yield) or otherwise e.g. could simply be ranked 1, 2, 3, by performance. Other ranking, weighting, or scoring systems could be used.

Therefore, the method overcomes the problems with making decisions based on generalizations about a population of seed, by "carrying" each data point along with the plant as it goes through the testing process. This data is then always associated with the experimental line it becomes in later testing. This allows more informed decisions on whether to advance the line to the next stage of testing or to abandon the line.

E. Options and Alternatives

It is to be understood that the above-described embodiments or examples are exemplary only and not all-inclusive or comprehensive of the forms and embodiments the invention can take. Variations obvious to one skilled in the art will be included within the scope of the invention.

For example, in some embodiments, data is in a database. By database, it is meant any stored or recorded information that is cross-correlated or cross-correlatable. This can include conventional computer databases, of a variety of software types or brands available commercially, or could be data set.

Another embodiment of the invention could additionally attach a machine-readable tag with a leaf punch and include data on the tag to associate the punch with the seed or plant from which it came.

Still further, it is to be understood that the invention can be used with a variety of kinds of data for association with the plant. In the above-described exemplary embodiments, the data is genetic data or traits (observed or detected) associated with plant lines (such things as disease-resistance, plant height, protein content, etc.) The data could be traits and characteristics such as are well known in the art relative to breeding programs.

The invention could also be used for things other than plant advancement experiments. One example would be to track nutraceuticals in selected plants. Others include, but are not limited to, tracking plants with certain characteristics (e.g. unique trait such as high value human protein, vaccines, or other substances), or plants with certain levels of expression, or plants with proper protein folding, oil profile and other natural or transgenic traits of interest. Other examples could be observations, comments, notes, disease screening, seed increases, yield testing, constituent analysis (e.g. $H_2O$ content, protein, chlorophyll, sugars, starches, oil, flavonoids), maturity, herbicide resistance, transgenic traits, and timing of these actions.

Therefore, as can be appreciated, data over and above plant identification, plot location, and plant experiment might be added to the machine-readable data. As machine-readable tags or similar things advance, more data space is available on or within the capacity of the tag.

Another alternative or option would be similar to the exemplary embodiment described above except threshed seed are placed into indexed cells of a planting tray, as opposed to a shipping or storage tray. A planting tray could be similar to indexing tray 40 of FIG. 4, having cells indexable by row and column number or identifier. A bar code could be generated and attached to the planting tray. At the field, a bar code reader could scan the planting tray bar code and an associated computer could tell the user when, where and how the seed from each cell should be planted.

A further alternative is similar to the exemplary embodiment except a computer could instruct the user or worker to place particular threshed seed into a cell in one of several indexing trays. As subsequent plants are threshed, the computer informs the workers which tray (and perhaps which cell of a tray) seed should be placed. The computer can also keep track of and/or instruct when the respective trays are ready for shipment to different locations. Such systems would not require that each try be full, before shipment or use.

Another alternative is similar to the above-described exemplary embodiment except that several more plant traits are determined, entered into the database and used to determine the ranking of each plant. The additional plant traits are selected from the group of genetic markers indicating a potential for increased yields, disease resistance, oil profile, and protein content. Other or additional traits or characteristics can be used Another alternative is the use of radio frequency (RF) tags that periodically burst stored data in radio waves rather than bar codes are attached to each plant. Instead of a bar code reader, the data is received and interpreted by a radio frequency receiver/processor. Other types of machine-readable data formats are possible, including systems that allow reading of data without having to get directly adjacent the plant. Also, another possible example is a system that allows both reading and writing to the label or tag on the plant.

Another option would be to utilize GPS technology with the invention. One example would be to use GPS to associate a GPS location with each plant in the database, correlated to plant number. In this manner, location in the field could be recorded without reference to a plot index.

Another example could allow a computerized or automated loading of the cells of a tray. A mechanized thresher could thresh a plant after the bar code or other machine-readable data is read. The computer could keep track of the position relative to cells in the tray, and sequentially advance through the tray and physically cause seed to be placed in the cells. The computer could keep track of which seed is in which cell.

The invention can be used to inventory seed by single plants. Because data for individual plants can be maintained throughout growing and post-harvest steps, data about a large number of plants can also be maintained and used to manage the plants and seed therefrom for a variety of reasons or purposes, including, but not limited to, use in plant advancement experiments. This may be very valuable because, again, it avoids generalizations about populations and instead preserves data about individual plants through threshing, and then into inventory or further use.

Machine readable data can be placed on or with, or can be associated with trays, bags, packages or other containers (or sets of containers), allowing sorting, indexing, inventorying, identification and retrieval, efficiently and with the flexibility of finding matches to criteria or queries for seeds of certain characteristics. The same subset of inventoried seed might match different criteria or queries.

Present methods tend to discard a substantial amount of seed (e.g. 80%). The present invention may save more seed or find other uses for what otherwise might be discarded.

What is claimed is:

1. A method of enhancing an experiment relating to plant breeding or advancement or genetic modification for field crop plants, wherein a part of the experiment comprises growing field crop plants from seed of known parentage or genetic trait in a growing location comprising:
(a) at a planting time, planting a set of seed of known parentage or genetic trait in the growing location;
(b) growing plants from the set of seed so that the plants from the seed emerge from the ground;
(c) during a growing time, physically attaching machine-readable identifying data on or with each of a plurality of the growing plants in the field, the data including information distinguishing each of the plurality of the growing plants from other plants; and maintaining a database including the identifying information correlated to each of the plurality of growing plants;
(d) during the growing time, deriving a trait or characteristic related to selected plants from the plurality of growing plants by analysis of each selected plant or a part thereof, the derived trait or characteristic comprising information indicative of a gene present in a seed of the selected plant, the information indicative of a gene present in a seed of the selected plant comprising information indicative of a gene that affects disease resistance, height, protein content, oil profile, flavonoids, yield, maturity, herbicide resistance, or a transgenic trait;
(e) adding to the database information about the derived trait or characteristic and correlating it with the seed of the selected plant to which it relates;
(f) at a harvest time, harvesting substantially all of the selected plants, or plant materials or seed of substantially all the selected plants, from the field, including those ultimately not selected for continued use in the experiment in a manner that does not require a correlation between each of the harvested selected plants and its position in the growing location in the field, but with the machine-readable data correlated with each plant or part thereof;

(g) reading the machine-readable data correlated with a harvested selected plant or part thereof;

(h) associating the derived trait or characteristic in the database with the identifying data read from the machine-readable data for the harvested plant or part thereof;

(i) deciding after harvest, on a seed by seed basis, whether each individual harvested selected plant or seed thereof will or will not be selected for continued use relative to the experiment using said association.

2. The method of claim 1 wherein the plants are forage grains.

3. The method of claim 1 wherein the growing location comprises an area of soil of relatively large size outdoors or in a greenhouse.

4. The method of claim 1 wherein machine-readable data comprises a bar code.

5. The method of claim 1 wherein machine-readable comprises an RF tag medium or magnetic storage medium.

6. The method of claim 1 wherein the identifying information comprises one or more of plant number, location within the growing location, experiment number, indexed location, plot number, plant program number, parentage, GPS location.

7. The method of claim 1 wherein the analysis is at the growing location.

8. The method of claim 1 wherein the analysis is away from the growing location.

9. The method of claim 1 wherein the analysis is of a part of the plant removed from the plant.

10. The method of claim 1 wherein the analysis is by non-destructive sensing or evaluation.

11. The method of claim 1 wherein the information indicative of genes present in a plant comprise at least one genetic marker.

12. The method of claim 1 wherein a tissue sample is taken from a selected plant and genetic analysis is conducted on the tissue sample.

13. The method of claim 1 wherein a step of further action comprises deciding whether to thresh or discard the harvested plant or any of its seed based on at least one derived characteristic associated with the harvested plant.

14. The method of claim 13 further comprising characterizing the plant, if threshed, using the at least one characteristic to decide what further action to take with any seed of the threshed plant based on one or more rules.

15. The method of claim 1 wherein a step of taking further action comprises one or more of disease screening, testing for seed increases, yield testing, constituent analysis, testing for nutraceuticals, testing for vaccines, testing for human protein, or the timing of these actions.

16. The method of claim 1 wherein a step of taking further action comprises placing threshed seed in an indexing tray.

17. The method of claim 16 wherein the indexing tray is indexable by cells of the tray.

18. The method of claim 16 further comprising generating machine-readable information about the placement of one or more seed in the cells of the indexer tray and placing the generated information on or in association with the tray.

19. An apparatus for tracking individual plants in or from a growing location in an experiment relating to plant breeding or advancement or genetic modification comprising:

(a) machine-readable data at least identifying a plant, the machine-readable data maintained in close physical association with said plant while growing;

(b) a computer adapted to store and operate on data;

(c) a machine adapted for operative communication with the computer and adapted to read said machine-readable data;

(d) plant data derived by analysis of the plant, or seed or other part thereof, while growing, the derived trait or characteristic comprising information indicative of a gene present in a seed of the selected plant, the information indicative of a gene present in a seed of the selected plant comprising information indicative of a gene that affects disease resistance, height, protein content, oil profile, flavonoids, yield, maturity, herbicide resistance, or a transgenic trait;

(e) a computer adapted to correlate the machine-readable data and the plant data for the plant, seed, or other part thereof;

(f) a display for viewing the correlated data so that a decision regarding the seed of the plant can be made even though the plant is harvested in a manner that does not require a correlation between each plant and its growing location.

20. The apparatus of claim 19 wherein the machine-readable data is information from which the parentage of a plant can be derived.

* * * * *